United States Patent
Seydnejad et al.

(10) Patent No.: US 6,590,700 B1
(45) Date of Patent: Jul. 8, 2003

(54) ADAPTIVE OPTICAL AMPLIFIER CONTROL

(75) Inventors: Saeid Seydnejad, Ottawa (CA); Frederic F. Simard, Nepean (CA); Zhongwei Li, Kanata (CA); Anant Grewal, Ottawa (CA); Aiping Liang, Dollard Des Ormeaux (CA); Kun Han, Ottawa (CA); Edgar Velez, Kanata (CA); Kevin Farley, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 10/068,937

(22) Filed: Feb. 11, 2002

(51) Int. Cl.⁷ ................................. H01S 3/00
(52) U.S. Cl. ................... 359/341.4; 359/337
(58) Field of Search .............. 359/341.4, 337

(56) References Cited

U.S. PATENT DOCUMENTS 5,909,305 A * 6/1999 Kinoshita .................. 359/341
6,008,935 A * 12/1999 Fujita et al. ............... 359/341
6,061,173 A * 5/2000 Yamane et al. ............ 359/345

FOREIGN PATENT DOCUMENTS

JP 02001144687 A * 5/2001

* cited by examiner

Primary Examiner—Mark Hellner
(74) Attorney, Agent, or Firm—Kent Daniels; Ogilvy Renault

(57) ABSTRACT

In method of controlling an optical amplifier dynamically adapts to both configuration and performance changes of a communications system. An error vector is calculated to indicate a difference between respective detected values and target values of a parameter of a light beam downstream of the optical amplifier. A sensitivity matrix indicative of a sensitivity of the detected parameter value to incremental changes in a control variable of the optical amplifier is calculated. A predicted optimum value of the control variable is then calculated using the error vector and the sensitivity matrix. Calculation of the predicted optimum control variable value can be iterative, with the sensitivity matrix calculated either during each iteration, or at the beginning of each optimization run. As a result, optimization of the amplifier control variables is performed based on a sensitivity matrix that accurately reflects the performance of the amplifier.

35 Claims, 4 Drawing Sheets

Figure 1a
(PriorArt)
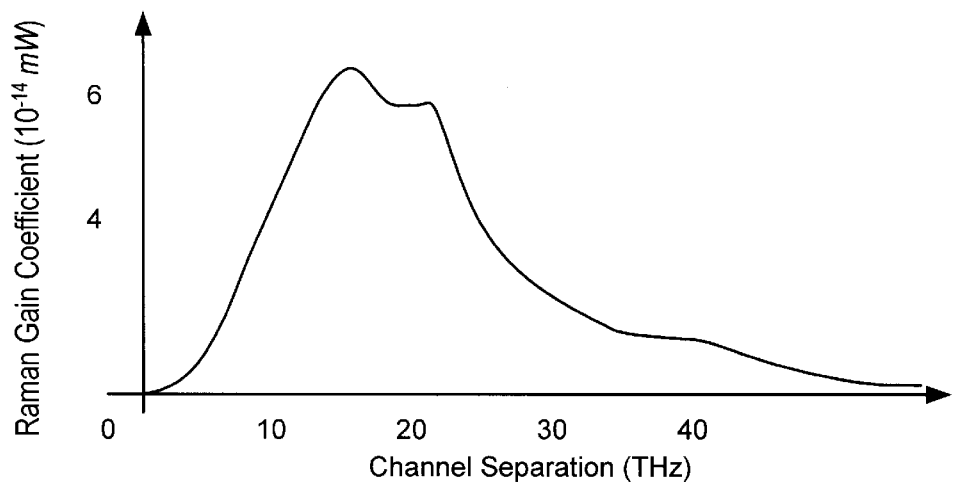
Figure 1b
(PriorArt)
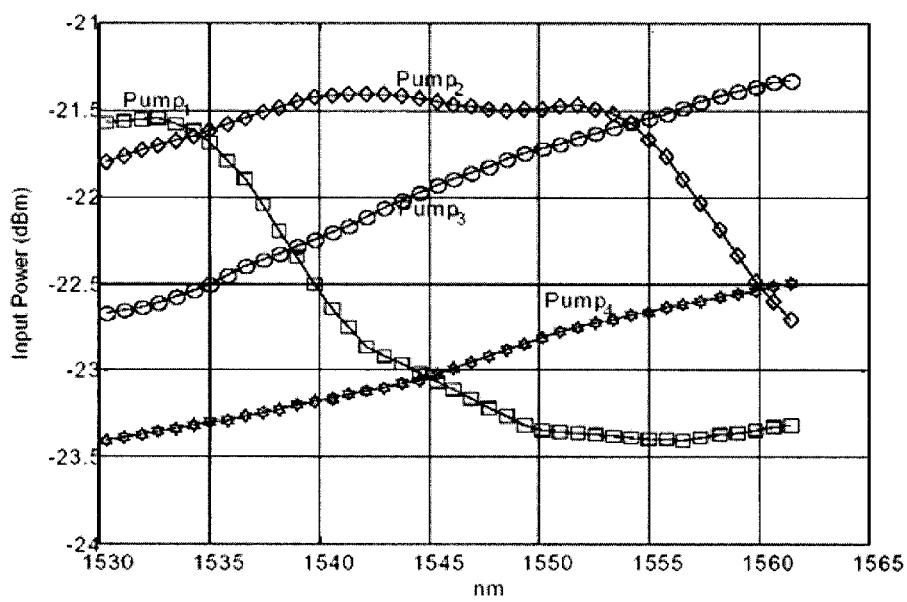

ADAPTIVE OPTICAL AMPLIFIER CONTROL

CROSS-REFERENCE TO RELATED APPLICATIONS

This is the first application filed for the present invention.

MICROFICHE APPENDIX

Not Applicable.

TECHNICAL FIELD

The present invention relates to optical transmission systems for telecommunications, and in particular, to a method and system for adaptive optical amplifier control.

BACKGROUND OF THE INVENTION

Long distance data transmission in optical networks requires periodic amplification of the optical signals to compensate for attenuation due to the cumulative effects of absorption and scatter in optical fibers. Different types of optical amplifiers can be used for this purpose such as for example, Raman amplifiers, erbium doped fiber amplifiers (EDFA) and variable optical attenuators (VOA). Optical amplifiers can also consist of several types of amplifying elements and thus can be considered hybrid amplifiers. In general, optical amplifiers can be controlled by several different control variables and the performance of the amplifiers can be determined by measuring several different output parameters. A general problem is thus, how to control multiple inputs (the control variables), to achieve desired values of multiple output parameters.

One example of an optical amplifier is the Raman amplifier, which plays an important role in optical communication systems because it permit longer fiber spans. It provides better signal amplification while introducing less noise than a traditional signal amplifier. The Raman amplifier compensates for fiber loss by providing signal gain in every span. It uses the non-linear scattering property of optical fiber known as Stimulated Raman Scattering (SRS) to transfer energy from pump lasers to signal channels.

The Raman effect causes light traveling within a medium, such as an optical fiber, to be amplified by the presence of shorter wavelength light traveling within the same medium. Energy is transferred from the shorter wavelength light to a longer wavelength signal. An exemplary gain spectrum of a silica fiber pumped by a single monochromatic Raman pump is illustrated in FIG. 1a. Multiple Raman pump lasers at different wavelengths can be used to spread this influence over a wider range of longer wavelengths. Backward Raman amplifiers typically use up to twelve (or more) pump lasers to provide amplification for across all of the signal channels of a Dense Wave-Division Multiplexed (DWDM) communications system. FIG. 1b illustrates exemplary gain profiles showing contributions of four Raman pumps to optical signal gain across a range of signal wavelengths. The net Raman gain profile is a result of the superposition of the individual pump profiles as well as the effects of nonlinear Raman interactions between the amplifier pumps and the signals.

One of the problems associated with such arrangements is the difficulty in achieving a desired gain (or other desired output parameter) profile over a range of wavelengths. The relative powers required for each pump changes as the mean gain of the amplifier changes, due to the complex interactions resulting from stimulated Raman scattering (SRS) between the various optical wavelengths in the fiber.

Effective use of a Raman amplifier in a DWDM communications network requires measurement of a desired output parameter (e.g. gain) and Raman pump control to obtain a desired parameter profile. To control a multiple pump Raman amplifier, the measured output parameter should be mapped to individual pump powers. Calculating a theoretical relationship between an output parameter and relative pump powers requires solving a non-linear system of differential equations that describe optical signal propagation and the Raman scattering phenomenon in the fiber, which is a tedious and cumbersome task. There are also practical issues which affect the usefulness and accuracy of using theoretical calculations, such as requiring a priori knowledge of the fiber type, accounting for connection losses, variations in fiber core size and attenuation, etc.

One solution to this problem is described in co-pending U.S. patent application Ser. No. 09/873,389 to Seydnejad et al., wherein Raman pump power levels required to provide a uniform gain across a range of wavelengths in an optical fiber, are determined by a combination of theoretical calculations and empirical measurement. A system of non-linear differential equations is solved for various pump powers and used to build a look-up table relating desired average signal gain to the relative pump powers required to provide a uniform gain (or other desired profile) across a range of wavelengths. The linear relationship between Raman pump power and average signal gain is determined by measuring data signal power levels at specific Raman pump powers. A desired average signal gain is first applied to the linear relationship to determine total power required, and then applied to the look-up table to determine the required relative pump powers. Disadvantages of this method include complexity of calculating theoretical Raman pump powers, dependence on a theoretical model which may not reflect actual Raman amplifier behavior, the reliance on knowledge of the fiber type, Raman gain coefficients, launch power, etc, lack of flexibility, and the possibility of changing conditions affecting the performance of the optical communication system.

Various operating conditions in optical transmission systems can vary over time. Fiber cables and associated connectors can change over time due to vibration, contamination or other causes. Amplifier characteristics such as gain and available power can change over the life of the amplifier due to aging. Signals can change due to component changes or optical properties such as polarization dependent loss (PDL) or nonlinear interactions. Signals can also change when new channels (signal wavelengths) are introduced into an optical transmission system. Also, any degradation or failure of a component in the optical transmission system can change the operating conditions in complex (frequently non-linear) ways.

Accordingly, a method and apparatus for providing adaptive control of an optical amplifier to achieve a desired output, without requiring a priori information of the optical transmission system, remains highly desirable.

SUMMARY OF THE INVENTION

An object of the present invention is to provide a method and apparatus for adaptive control of an optical amplifier.

Accordingly, an aspect of the present invention provides a method of controlling an optical amplifier, the method comprises steps of: calculating an error vector indicative of a difference between respective detected values and target values of a parameter of a light beam downstream of the optical amplifier; calculating a sensitivity matrix indicative of a sensitivity of the detected parameter value to incremental changes in a control variable of the optical amplifier; and calculating a predicted optimum value of the control variable using the error vector and the sensitivity matrix.

Another aspect of the present invention provides a system for controlling an optical amplifier. The system comprises an error calculator for calculating an error vector indicative of a difference between respective detected values and target values of a parameter of a light beam downstream of the optical amplifier; a sensitivity matrix calculator for calculating a sensitivity matrix indicative of a sensitivity of the detected parameter value to incremental changes in a control variable of the optical amplifier; and a controller for calculating a predicted optimum value of the control variable using the error vector and the sensitivity matrix.

The optical amplifier may be any of a Raman amplifier; a Erbium Doped Fiber Amplifier (EDFA); or a hybrid of these. In either case, the control variables may conveniently represent an output power of each pump laser of the amplifier, and the sensitivity matrix represented as a function of each pump output power. The target values may be either fixed, or variable, as desired.

In some embodiments of the invention, the predicted optimum value of the control variable is calculated by determining a control variable value that minimizes the error vector. This may be accomplished using a least mean squares technique.

Preferably, calculation of the predicted optimum control variable value and calculation of the error vector are repeated through one or more iterations in order to converge upon a predicted optimum control variable value that is a best estimate of the optimum control variable value. This iterative calculation procedure can be initiated by a predetermined trigger condition (e.g. when the error vector becomes too large) and terminated by a predetermined termination condition (e.g. a maximum number of iterations; the error vector becomes smaller than a predetermined threshold etc.) The sensitivity matrix may be recalculated during each iteration. Alternatively, the sensitivity matrix can be calculated at the start of an optimization run (i.e. upon detection of the trigger condition) and then held constant for subsequent iterations (i.e. until the termination condition is satisfied).

Thus the present invention provides a method and system for controlling an optical amplifier, which dynamically adapts to both configuration and performance changes of the amplifier and the optical communications system within which it is deployed. An error vector is calculated to indicate a difference between respective detected values and target values of a parameter of a light beam downstream of the optical amplifier. A sensitivity matrix indicative of a sensitivity of the detected parameter value to incremental changes in a control variable of the optical amplifier is calculated. A predicted optimum value of the control variable is then calculated using the error vector and the sensitivity matrix. Calculation of the predicted optimum control variable value can be iterative, with the sensitivity matrix calculated either during each iteration, or at the beginning of each optimization run. As a result, optimization of the amplifier control variables is performed based on a sensitivity matrix that accurately reflects the performance of the amplifier.

BRIEF DESCRIPTION OF THE DRAWINGS

Further features and advantages of the present invention will become apparent from the following detailed description, taken in combination with the appended drawings, in which:

FIG. 1a is a graph showing an exemplary Raman gain curve for an optical fiber illustrating signal gain due to Raman coupling as a function of wavelength offset;

FIG. 1b is a graph showing exemplary Raman gain curves for an optical fiber as a function of wavelength offset, illustrating signal gain due to the contributions of individual Raman pumps;

It will be noted that throughout the appended drawings, like features are identified by like reference numerals.

DETAILED DESCRIPTION OF THE PREFERRED EMBODIMENT

Figure 2:
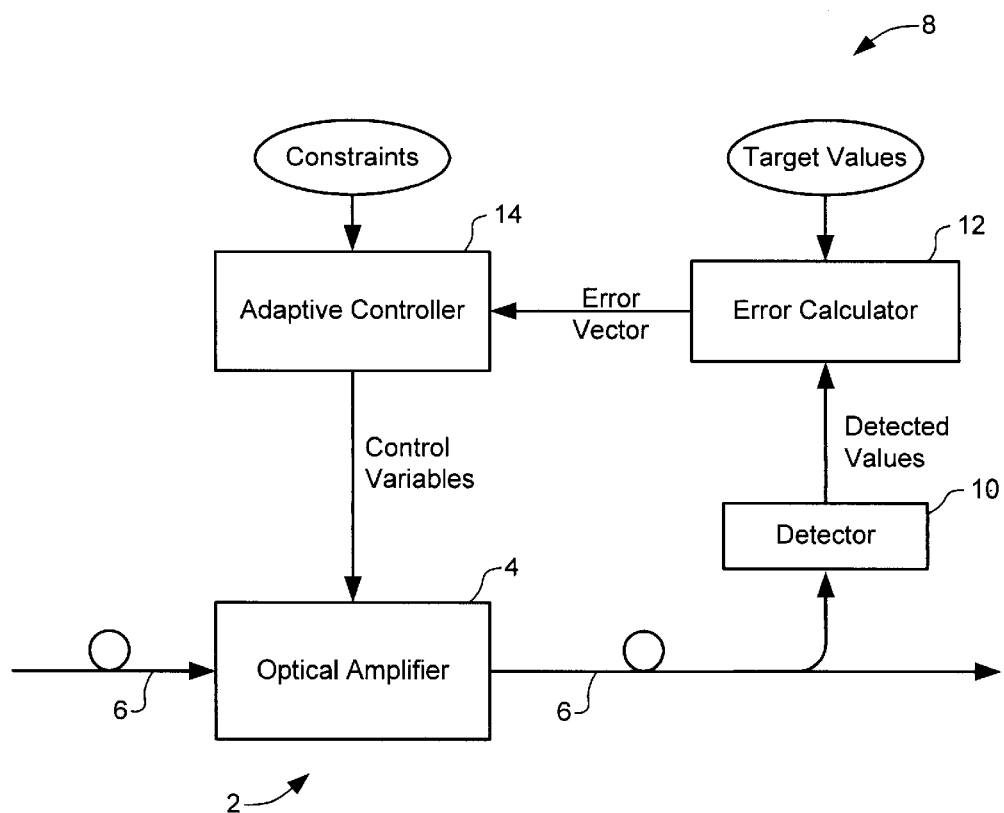
FIG. 2 is a block diagram schematically illustrating exemplary elements of an adaptive optical amplifier control in accordance with the present invention.

The present invention provides a method and system for adaptive optical amplifier control. It is well suited to amplifiers having a plurality of measurable output parameters and a plurality of control variables, and is especially well suited to situations where operating conditions can vary. It is noted that the embodiments described below and illustrated in the appended figures, can be deployed to control Raman amplifiers. However, those of ordinary skill in the art will appreciate that the method and system of the present invention can equally be applied to other amplifier systems, such as for example systems incorporating multiple optical amplifiers, Erbium Doped Fiber Amplifier (EDFA) systems and hybrid amplifiers and amplifier systems. Thus it will be understood that the embodiment described below is in no way limitative of the present invention. FIG. 2 is a block diagram schematically illustrating principle elements of an exemplary adaptive optical amplifier control system deployed in an optical transmission system.

As shown in FIG. 2 the optical transmission system 2 includes an optical amplifier 4 which operates in a manner well known in the art to amplify a light beam in an optical fiber 6. The system 8 of the present invention generally includes a detector 10, an error calculator 12 and an adaptive controller 14, which cooperate to form a feed-back control system for controlling an optical amplifier 4.

The detector 10 taps the optical fiber 6 down stream of the optical amplifier 4 in order to detect one or more values of a selected parameter of the light beam. Exemplary parameters which may be detected are signal power, signal-to-noise-ratio (SNR), optical signal-to-noise ratio (OSNR), bit-error-rate (BER) or Q of the optical amplifier. Other measurable parameters may also be used, as desired. In a Wavelength Division Multiplexed (WDM) or Dense Wavelength Division Multiplexed (DWDM) optical transmission system 2, values of the selected parameter can be detected on a per-wavelength or per-channel basis, to provide more detailed information spanning the wavelengths of interest (i.e., those wavelengths used for data transmission).

The error calculator 12 operates to compare the detected values with a set of target values, and passes the comparison result to the adaptive controller 14. As may be appreciated, various techniques may be used to compare the detected and target values. A simple method is to calculate a difference between each detected value and a corresponding target value, and this method is employed in the illustrated embodiment (as will be described in greater detail below). However, it will be understood that other comparison methods may used, if desired. In a WDM or DWDM system, individual target values corresponding to each detected value (e.g. on a per channel or per-wavelength basis) may be used. This arrangement is particularly suitable in cases where it is desired that the target value should vary with wavelength (or channel). Alternatively, a single target value may be used, for example where it is desired to control the optical amplifier 4 such that the detected values are substantially equal across the range of wavelengths of interest. If desired, the (or each) target value can be a fixed constant. Alternatively, the target value(s) can be varied, for example as the total optical power through the optical amplifier 4 changes.

Based on the comparison result obtained by the error calculator 12, the adaptive controller 14 determines whether or not the detected parameter values are sufficiently close to the target values. If they are, then no changes are made to the control variables governing operation of the optical amplifier 4. In a Raman pump optical amplifier 4, these control variables will typically govern the output power of each pump laser. However, other control variables may also be controlled by the method of the present invention. If the detected parameter values are not sufficiently close to the target values, the adaptive controller 14 executes an iterative process to calculate one or more predicted optimum control variable values. The expression "predicted optimum" value will be understood to mean the best value that can be achieved with the current information. Thus in an iterative process, each iteration will calculate the best value based on the information available in that iteration, converging toward a near-optimum value of the control variable. These predicted optimum control variables are then applied to the optical amplifier 4. This process continues until the adaptive controller 14 determines that the detected parameter values are sufficiently close to the target values, or until some other exit condition is satisfied (as will be described in greater detail below).

For simplicity of description, FIG. 2 shows only one optical amplifier. However, it will be appreciated that a plurality of optical elements (including other optical amplifiers) may be provided in the optical transmission system. Similarly, the amplifier 2 may be a hybrid optical amplifier comprising one or more optical amplifiers and/or one or more different types of optical amplifiers (e.g. Raman pump, EDFA etc.). Clearly, one or more optical elements may be positioned on the fiber 6 between the optical amplifier 2 and the detector 10. Thus the present invention can equally be used to control a optical amplifiers on a single span, or simultaneously control multiple optical amplifiers distributed over a plurality of spans; of an optical transmission system.

Figure 3:
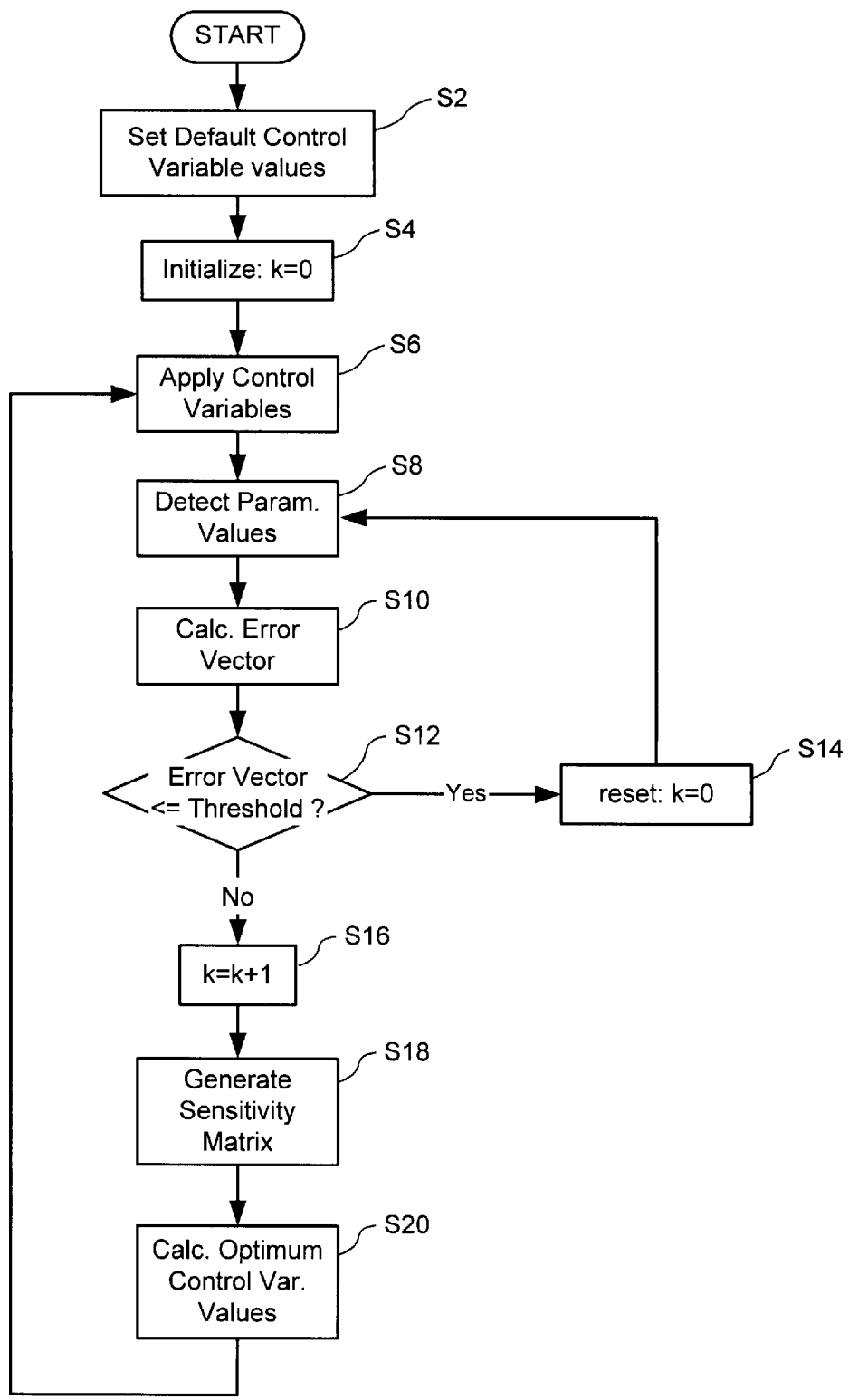
FIG. 3 is a flowchart of an exemplary embodiment of a process for adaptive optical amplifier control in accordance with the present invention.

FIG. 3 is a flowchart illustrating principle operations of the present invention in greater detail. As shown in FIG. 3, operation of the present invention starts by setting the control variables to a default initial value at step S2, and initializing an iteration counter k at step S4. In the case of a Raman amplifier, each control variable can govern an individual pump power, which could be set to a default value of, for example 100 mW each. At step S6, the control variables are applied to the optical amplifier 4, and the detector 10 detects values of the selected parameter (such as, for example, the signal power of each channel) at step S8. For WDM and DWDM systems, the detected parameters can conveniently be represented as a one-dimensional matrix (or vector) of the form:

$$\underline{S} = \begin{bmatrix} S_1 \\ S_2 \\ \vdots \\ S_N \end{bmatrix} \quad \text{(Equ. 1)}$$

where $S_i$ is the detected actual value of the selected parameter in channel i. This detected parameter vector is then passed to the error calculator 12, and compared with target values at step S10. The comparison result can conveniently be defined as an error vector $\underline{E}$ in the form of a one-dimensional matrix such as:

$$\underline{E} = \begin{bmatrix} S_1 - T_1 \\ S_2 - T_2 \\ \vdots \\ S_N - T_N \end{bmatrix} \quad \text{(Equ. 2)}$$

where $T_i$ is the target value corresponding to $S_i$. Thus, in the present example, $T_i$ represents the target value of the selected parameter for channel i.

The error vector $\underline{E}$ is then evaluated by the adaptive controller 14 at step S12 to determine if the detected and target parameter values are sufficiently close. This can readily be determined by comparing the norm of the error vector $\underline{E}$ to a predetermined threshold (which may, for example, be determined either analytically or empirically, or based on system requirements).

If the detected and target parameter values are found to be sufficiently close (that is, the norm of the error vector $\underline{E}$ is less than or equal to the predetermined threshold), then the adaptive controller 14 makes no changes to the control variables governing operation of the optical amplifier 4. Instead, the iteration counter K is reset at step S14, and processing continues from step S8 above.

On the other hand, if the norm of the error vector $\underline{E}$ is found to be greater than the predetermined threshold at step S12, then the iteration counter K is incremented (step S16) and an information gathering process is executed at step S18 to generate a new sensitivity matrix. The sensitivity matrix relates incremental changes in each control variable to corresponding changes in detected parameter values, and can conveniently be represented as a two-dimensional matrix of the form:

$$\underline{J} = \begin{bmatrix} \underline{j}_1 \\ \underline{j}_2 \\ \vdots \\ \underline{j}_N \end{bmatrix} \quad \text{(Equ. 3)}$$

in which each row $\underline{j}_m$ represents a sensitivity error vector for control variable m, and N is the number of control variables. In general, the sensitivity error vector $\underline{j}_m$ indicates the difference between the parameter values $\underline{S}$ (Equ. 1 above) detected with the current set of control variable values P, and the parameter values $\underline{S}$ detected by the detector 10 with value $P_m$ of the respective control variable m incremented by ΔP, and divided by the control variable increment (the other control variable values being held unchanged). Thus:

$$j_m = \frac{S|_{P_m+\Delta P} - S|_{P_m}}{\Delta P} \quad \text{(Equ. 4)}$$

As may be appreciated, the information gathering step S18 is a loop process that executes for each control variable in order to populate the sensitivity matrix. For each control variable, in turn, the adaptive controller 14 increments that control variable value $P_m$ by a predetermined amount ($\Delta P$) and applies the incremented control variable to the optical amplifier 4. The resulting change in the detected values of the parameters, represented by sensitivity error vector $j_m$ is then stored in a corresponding row of the sensitivity matrix $\underline{J}$.

The adaptive controller 14 preferably implements Jacobi iterations in a method of simultaneous corrections. That is, the sensitivity matrix $\underline{J}$ is entirely populated and analyzed to calculate predicted optimum control variable values, before any of these predicted optimum control variable values are applied to the optical amplifier 14.

In the embodiment of FIG. 3 the sensitivity matrix is regenerated at he beginning of each iteration k. This approach has the advantage that the sensitivity matrix most accurately reflects the actual relationship between the control variables and the detected parameters throughout the optimization process. However, in some cases, regeneration of the sensitivity matrix during each iteration may be found to be undesirably computationally intensive and intrusive of live traffic being processed through the optical amplifier. In such cases, the sensitivity matrix can be calculated during the first iteration (k=1) and then same sensitivity matrix reused for each successive iteration (k>1). Experimentation has shown that this approximation to the sensitivity matrix for successive iterations still produces satisfactory results while reducing computational complexity.

At step S20, the predicted optimum control variable values are calculated by estimating the control variable values that will minimize the error vector $\underline{F}$ as a function of the control variables. A least mean squares algorithm can conveniently be used to minimize the error vector $\underline{F}$, although other techniques may be used.

From a theoretical point of view, the error vector $\underline{F}$ (Equ. 2 above) can be represented as a function of the control variable values, which can be written in vector notation as:

$$\underline{P} = \begin{bmatrix} P_1 \\ P_2 \\ \vdots \\ P_N \end{bmatrix} \quad \text{(Equ. 5)}$$

Thus the error vector $\underline{F}$ can be written as $\underline{F}(\underline{P})$. The predicted optimum value of $\underline{P}$ is that which minimizes the norm of $\underline{F}(\underline{P})$. Thus $\phi(\underline{P})$ should be minimized, where:

$$\phi(\underline{P}) \equiv \frac{1}{2} \underline{F}^T(\underline{P})\underline{F}(\underline{P}) \quad \text{(Equ. 6)}$$

To accommodate nonlinear behavior of optical amplifiers, a modified Newton algorithm can be used. Accordingly, at iteration k the non-linear function (Equ. 6) is approximated by a quadratic function with variable step size, such as:

$$\phi(\underline{P}_k + \underline{\delta}_k) \approx \phi(\underline{P}_k) + \underline{\delta}_k^T \nabla \phi_k + \frac{1}{2} \underline{\delta}_k^T \nabla^2 \phi_k \underline{\delta}_k \quad \text{(Equ. 7)}$$

where $\nabla \phi$ and $\nabla^2 \phi$ are the gradient and Hessian matrices, respectively, which are upgraded in every iteration with incremental changes in control variables $\underline{\delta}_k$, where $$\underline{\delta}_k = \begin{bmatrix} \delta_1 \\ \delta_2 \\ \vdots \\ \delta_N \end{bmatrix} \quad \text{(Equ. 8)}$$

and where $\delta_m$ is the required adjustment in control variable m for iteration k. Gradient, Hessian and Jacobian matrices are well known mathematical constructs.

A Jacobian matrix is defined as:

$$J_k = [J_{i,m}] = \left[\frac{\partial S_i}{\partial P_m}\right] \quad \text{(Equ. 9)}$$

where k is the iteration number, $\partial S_i$ is a change in the detected value of parameter i as a function of a change in $\partial P_m$, which is a change in control variable m. It is well known that $$\nabla \phi = J_k^T \underline{F}_k \quad \text{(Equ. 10)}$$

and (Equ. 10)

$$\nabla^2 \phi = J_k^T J_k + \sum_{i=1}^{N} (S_{i_k} - T_i) \cdot \nabla^2 (S_{i_k} - T_i) \quad \text{(Equ. 11)}$$

At a minimum $$(\nabla^2 \phi_k)\underline{\delta}_k = -\nabla \phi_k \quad \text{(Equ. 12)}$$

therefore $$\left[J_k^T J_k + \sum_{i=1}^{N} (S_{i_k} - T_i) \cdot \nabla^2 (S_{i_k} - T_i)\right]\underline{\delta}_k = -J_k^T \underline{F}_k \quad \text{(Equ. 13)}$$

A pseudo-inverse of matrix $J^T J$ can be computed as part of the calculation of the predicted optimum control variable values. It is noted that the "predicted optimum" is the best value that can be obtained based on information available, and that the approximation of Equ. 7 affects the accuracy of the results slightly. To avoid numerical instability in the matrix inversion, and to simplify calculations, a regularization factor v·I, is used to add a small bias to the diagonal of the matrix. v is a constant and I is an identity matrix sized to match the number of control variables. In some case there may be no need for the regularization factor and v=0. Theoretically, v=0 would produce the best results, but in practice, this increases sensitivity to inaccuracies in measurements and assumptions.

If desired, the regularization factor can be kept constant during the optimization. For example, v=0.1 is appropriate for a large range of conditions. It has been found that if the regularization factor is too large, the final error can be larger than the best solution. This is expected because the solutions are further away from the original formulation in Equ. 13, where the second term is typically very small. Alternatively, the regularization factor can be modified at every iteration to ensure numerical stability so that the determinant of the matrix to be inverted is beyond a predetermined threshold. Equ. 13 can therefore be simplified as $$[J_k^T J_k + v \cdot I] \underline{\delta}_k = -J_k^T \underline{F}_k \quad \text{(Equ. 14)}$$

and control variable adjustments can be defined as:

$$\underline{\delta}_k = -[J_k^T J_k + v \cdot I]^{-1} J_k^T \underline{F}_k \quad \text{(Equ. 15)}$$

For each iteration, the predicted optimum control variable values can be defined as:

$$\underline{P}_{k+1} = \underline{P}_k + \underline{\delta}_k \quad \text{(Equ. 16)}$$

Thus, the adaptive controller 14 solves equations (15) and (16) to calculate the predicted optimum value of each control variable for iteration k.

As is well known in the art of dynamic systems, sudden changes in operating parameters of a system can cause system instability. Accordingly, various predetermined constraints can be applied to the predicted optimum control variable values calculated by Equ. 16 above. Exemplary constraints may include maximum and minimum allowable values for each control variable, a maximum total value of the control variables, maximum allowable changes in control variable values between iterations, and other constraints imposed by physical limitations of the optical transmission system 2.

In an embodiment of the present invention, a convergence factor $\mu$, (where $0<\mu<1$) can be included to provide a means of controlling the speed of adaptation and ensure stability of the algorithm under a variety of adverse conditions. For convenience, the pseudo-inverse of the sensitivity matrix J can be denoted as H, where $$H = ([J_k^T J_k + v \cdot I])^{-1} J_k^T \quad \text{(Equ. 17)}$$

Thus Equ. 15 can be rewritten as $$\delta_k = -H \cdot F_k \quad \text{(Equ. 18)}$$

and when the convergence factor is included, Equ. 15 can be rewritten as $$\delta_k = -\mu \cdot H \cdot F_k \quad \text{(Equ. 19)}$$

Thus, Equ. 15 represents the case where $\mu=1$. A convergence factor of 1 ($\mu=1$), produces the fastest convergence and stable results, provided the sensitivity matrix is computed at every iteration. If $\mu>1$, then the adaptation process becomes unstable. Experimentation has shown that values of $\mu$ between 0.25 and 0.5 produce excellent results under severe conditions of inaccuracies in measurements. The smaller the convergence factor is, the slower the convergence process is. This can be useful when the optical transmission system is operational and carrying live traffic by allowing smooth and continuous adjustment to occur. A smaller convergence factor can also reduce the negative effects of inaccuracies in measurements and in the sensitivity matrix J. This can be useful since the elements of the error vector $\underline{F}$ are usually non-zero even when the system has converged to an optimal solution.

Various other techniques can also be employed to address problems that may arise during operation. For example, if the minimization algorithm calculates a control variable value that exceeds a predetermined maximum or minimum allowable value of that control variable, then the contribution of that control variable can be ignored for that iteration by dropping the corresponding row in the sensitivity (Jacobian) matrix and performing the minimization algorithm only on the remaining control variables.

The new control variable values $\underline{P}_{k+1}$ (calculated by Equ. 16 above and possibly modified by imposition of constraints) are then applied to the optical amplifier 4 (step S6) and processing continues as described above for steps S8–S20 until the detected and target parameter values are found to be sufficiently close at step S12. Those skilled in the art will recognize that various other exit conditions may be used at step S12 to terminate the optimization process, such as, for example, a maximum allowable number of iterations, or a minimum permissible change in either the error vector $\underline{F}$ or the control variables $\underline{P}$ between successive iterations.

The process described above is an iterative process that converges to a near-optimum solution for control variable values $\underline{P}$ (within a certain error tolerance).

Figure 4:
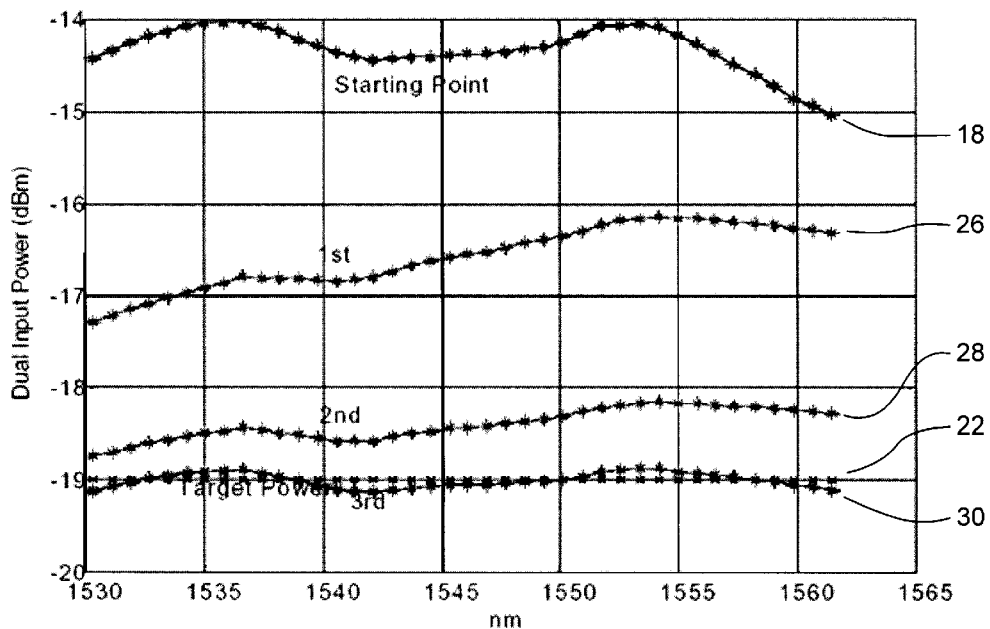
FIG. 4 is an exemplary graph illustrating the effect on power distribution of 40 optical channels, by successive iterations of an embodiment of the process of the present invention.
Figure 5:
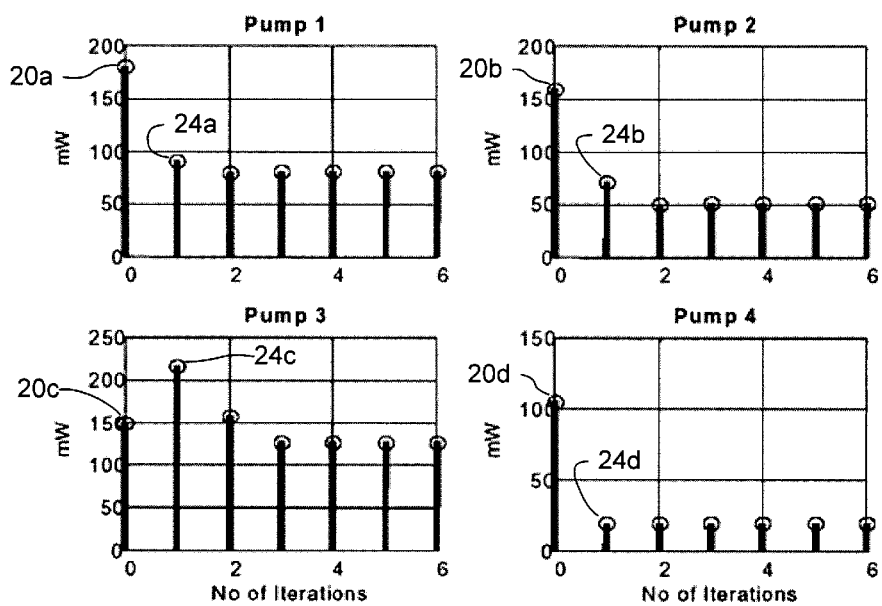
FIG. 5 is an exemplary graph illustrating pump power changes as a function of iteration number for 4 Raman pumps.

FIG. 4 is an exemplary graph illustrating the effect on power distribution of 40 optical channels of an optical amplifier, by successive iterations of an embodiment of the process of the present invention. In this example, the optical amplifier is a Raman amplifier having four Raman pumps. The detected values of parameters are optical power of individual optical signal channels at the output of the Raman amplifier. The control variables of this example are the pump powers of the individual Raman pumps of the Raman amplifier. The values of the Raman pump powers corresponding to successive iterations of the curves of FIG. 4 are illustrated in FIG. 5, which is an exemplary graph illustrating pump power changes as a function of iteration number for 4 Raman pumps. Curve 18 represents detected values of optical power of 40 optical channels at a starting point (iteration k=0). Points 20a, 20b, 20c and 20d (in FIG. 5) represent the Raman pump powers at iteration k=0 which yield the curve 18. Curve 22 represents corresponding target values (in this case: −19 dBm) for each of the 40 optical channels. Applying the process of an embodiment of the present invention results in a first iteration (k=1) of pump powers 24a, 24b, 24c and 24d which yields curve 28 of FIG. 4. Second and third iterations produce detected values of optical power as shown by curves 28 and 30. By the third iteration (curve 30) the detected values are very close to the target values (curve 22), and could meet the exit criteria for the process. Subsequent iterations would not produce any significant further change in the pump powers and the power distribution curve 30. Accordingly, the threshold for evaluating the error vector $\underline{F}$ can be selected so that curve 30 will satisfy the termination condition at step S12 (FIG. 3).

The embodiments of the present invention described above use a least mean squares algorithm to minimize the error vector. Those skilled in the art will recognize that other techniques may be used to minimize the error vector. Thus, for example, in another embodiment of the present invention, a proportional-integral type of control can be used. The control variable adjustments can then be defined as a function of the history of the error vector instead of only the error vector of the current iteration and Equ. 19 can be rewritten as:

$$\delta_k = -\mu \cdot H \cdot (k_1 F_k + k_2 F_{k-1}) \quad \text{(Equ. 20)}$$

where $k_1$ and $k_2$ are appropriate constants related to proportional and integral control coefficients. The predicted optimum control variable values are still defined as in Equ. 16 and the sensitive matrix remains as defined previously. This approach has the advantage of incorporating some degree of error filtering.

The embodiment(s) of the invention described above is(are) intended to be exemplary only. The scope of the invention is therefore intended to be limited solely by the scope of the appended claims.

We claim:

1. A method of controlling an optical amplifier, the method comprising steps of:

calculating an error vector indicative of a difference between respective detected values and target values of a parameter of a light beam downstream of the optical amplifier;

calculating a sensitivity matrix indicative of a sensitivity of the detected parameter value to incremental changes in a control variable of the optical amplifier;

calculating a predicted optimum value of the control variable using the error vector and the sensitivity matrix; and applying the calculated predicted optimum value of the control variable to the optical amplifier.

2. A method as claimed in claim 1, wherein the parameter comprises any one of: signal power; Signal-to-Noise Ratio (SNR); Optical Signal-to-Noise Ratio (OSNR); Bit Error Rate (BER); optical power; or gain.

3. A method as claimed in claim 1, wherein the control variable governs an output power of a pump laser of the optical amplifier.

4. A method as claimed in claim 1, wherein the step of calculating the error vector comprises steps of:

measuring the detected value of the parameter; and subtracting the detected value from the target value.

5. A method as claimed in claim 4, wherein the error vector comprises a respective value for each one of a plurality of signal wavelengths of the optical amplifier, and wherein the step or measuring the detected value of the parameter comprises a step of measuring a respective detected parameter value for each signal wavelength.

6. A method as claimed in claim 5, wherein the step of subtracting the detected value from the target value comprises subtracting the respective detected parameter value for each signal wavelength from a common target value.

7. A method as claimed in claim 5, wherein the step of subtracting the detected value from the target value comprises subtracting the respective detected parameter value for each signal wavelength from a corresponding respective target value.

8. A method as claimed in claim 1, wherein the step of calculating the sensitivity matrix comprises steps of:

incrementing a value of the control variable by a predetermined amount;

measuring a change in the detected parameter value resulting from the incremented control variable value; and storing the measured change in the sensitivity matrix.

9. A method as claimed in claim 8, wherein the steps of incrementing the control variable value, measuring a change in the detected parameter, and storing the measured change in the sensitivity matrix, are repeated for each one of a set of two ore more control variables, in turn, while holding a value of each of the other control variables constant.

10. A method as claimed in claim 1, wherein the step of calculating the predicted optimum value of the control variable comprises a step of estimating a value of the control vector that minimizes the value of the error vector.

11. A method as claimed in claim 10, wherein the step of estimating the value of the control variable that minimizes the value of the error vector comprises a step of solving the equation:

$$\underline{\delta}_k = -[J_k^T J_k + v \cdot I]^{-1} J_k^T \underline{F}_k$$

where $\underline{\delta}_k$ is an estimated change in the control variable value that will minimize the error vector; $J_k$ is the sensitivity matrix; $\underline{F}$ is the error vector; I is an identity matrix; and v is a regularization factor.

12. A method as claimed in claim 10, wherein the steps of calculating the error vector, calculating the predicted optimum control variable values, and applying the predicted optimum control variable values to the optical amplifier are repeated in each one of a plurality of successive iterations until a predetermined exit condition is satisfied.

13. A method as claimed in claim 12, wherein the predetermined exit condition comprises any one or more of:

the error vector is less than or equal to a predetermined threshold;

a maximum allowable number of iterations has been completed;

a change in the error vector between any two successive iterations is less than a predetermined threshold; and a change in the control variable between any two successive iterations is less than a predetermined threshold.

14. A method as claimed in claim 12, wherein the step of calculating the sensitivity matrix is executed during each iteration.

15. A method as claimed in claim 12, wherein the step of calculating the sensitivity matrix is executed during a first iteration and held constant for subsequent iterations until the exit conditions is satisfied.

16. A method as claimed in claim 12, wherein the step of calculating a predicted optimum value of the control variable comprises imposing a predetermined constraint on the control variable.

17. A method as claimed in claim 16, wherein the predetermined constraint comprises any one of:

a predetermined minimum value of the control variable;

a predetermined maximum value of the control variable;

a predetermined maximum change in the value of the control variable between successive iterations.

18. A system for controlling a optical amplifier, the system comprising:

an error calculator adapted to calculate an error vector indicative of a difference between respective detected values and target values of a parameter of a light beam downstream of the optical amplifier; and a controller adapted to:

calculate a sensitivity matrix indicative of a sensitivity of the detected parameter value to incremental changes in a control variable of the optical amplifier;

calculate a predicted optimum value of the control variable using the error vector and the sensitivity matrix; and apply the calculated predicted optimum value of the control variable to the optical amplifier.

19. A system as claimed in claim 18, wherein the parameter comprises any one of: signal power; Signal-to-Noise Ratio (SNR); Optical Signal-to-Noise Ratio (OSNR); Bit Error Rate (BER); optical power; or gain.

20. A system as claimed in claim 18, wherein the control variable governs an output power of a pump laser of the optical amplifier.

21. A system as claimed in claim 18, further comprising a detector adapted to measure the detected value of the parameter.

22. A system as claimed in claim 21, wherein the detector is adapted to measure a respective detected parameter value for each one of a plurality of signal wavelengths.

23. A system as claimed in claim 21, wherein the error calculator is adapted to subtract the detected value from the target value.

24. A system as claimed in claim 23, wherein the error calculator is adapted to subtract the respective detected parameter value for each signal wavelength from a common target value.

25. A system as claimed in claim 23, wherein the error calculator is adapted to subtract the respective detected parameter value for each signal wavelength from a corresponding respective target value.

26. A system as claimed in claim 18, wherein the controller comprises:

means for incrementing a value of the control variable by a predetermined amount;

a processor adapted to determine a change in the detected parameter value resulting from the incremented control variable value, and to store the determined change in the sensitivity matrix.

27. A system as claimed in claim 26, wherein the controller is adapted to increment the control variable value, determine the resulting change in the detected parameter, and store the determined change in the sensitivity matrix, for each one of a set of two ore more control variables, in turn, while holding the value of each of the other control variables constant.

28. A system as claimed in claim 18, wherein controller is adapted to calculate the predicted optimum value of the control variable by estimating a value of the control vector that minimizes the value of the error vector.

29. A system as claimed in claim 28, wherein the value of the control variable that minimizes the value of the error vector is estimated by solving the equation:

$$\underline{\delta}_k = -[J_k^T J_k + v \cdot I]^{-1} J_k^T \underline{F}_k$$

where $\underline{\delta}_k$ is an estimated change in the control variable value that will minimize the error vector; $J_k$ is the sensitivity matrix; $\underline{F}$ is the error vector; I is an identity matrix; and v is a regularization factor.

30. A system as claimed in claim 28, wherein the controller is adapted to execute the steps of calculating the error vector, calculating the predicted optimum control variable values, and applying the predicted optimum control variable values to the optical amplifier for each one of a plurality of successive iterations until a predetermined exit condition is satisfied.

31. A system as claimed in claim 30, wherein the predetermined exit condition comprises any one or more of:

the error vector is less than or equal to a predetermined threshold;

a maximum allowable number of iterations has been completed;

a change in the error vector between any two successive iterations is less than a predetermined threshold; and a change in the control variable between any two successive iterations is less than a predetermined threshold.

32. A system as claimed in claim 30, wherein the controller is adapted to calculate the sensitivity matrix during each iteration.

33. A system as claimed in claim 30, wherein the controller is adapted to calculate the sensitivity matrix during a first iteration, and then hold the sensitivity matrix constant for subsequent iterations until the exit condition is satisfied.

34. A system as claimed in claim 30, wherein the controller is adapted to impose a predetermined constraint on the control variable.

35. A system as claimed in claim 16, wherein the predetermined constraint comprises any one of:

a predetermined minimum value of the control variable;

a predetermined maximum value of the control variable; and a predetermined maximum change in the value of the control variable between successive iterations.

* * * * *